United States Patent
Harter, Jr. et al.

(10) Patent No.: US 6,927,674 B2
(45) Date of Patent: Aug. 9, 2005

(54) VEHICLE INSTRUMENT CLUSTER HAVING INTEGRATED IMAGING SYSTEM

(75) Inventors: Joseph E. Harter, Jr., Kokomo, IN (US); Gregory K. Scharenbroch, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 10/103,202

(22) Filed: Mar. 21, 2002

(65) Prior Publication Data

US 2003/0201895 A1 Oct. 30, 2003

(51) Int. Cl.[7] .............................................. B60Q 1/00
(52) U.S. Cl. ................. 340/425.5; 340/436; 340/815.4; 340/439; 340/575
(58) Field of Search .................. 340/575, 576, 340/579, 425.5, 439, 436, 905, 937, 815.4; 348/148, 231.1, 231.99, 208, 340, 118

(56) References Cited

U.S. PATENT DOCUMENTS

| | | | | |
|---|---|---|---|---|
| 5,027,104 A | * | 6/1991 | Reid | 340/541 |
| 5,689,241 A | * | 11/1997 | Clarke, Sr. et al. | 340/575 |
| 5,699,057 A | * | 12/1997 | Ikeda et al. | 340/937 |
| 5,786,765 A | * | 7/1998 | Kumakura et al. | 340/567 |
| 6,441,726 B1 | | 8/2002 | Voto et al. | |
| 6,525,653 B1 | * | 2/2003 | Rigmaiden | 340/426 |
| 6,575,607 B1 | | 6/2003 | Klemish et al. | |

\* cited by examiner

*Primary Examiner*—Hung T. Nguyen
(74) *Attorney, Agent, or Firm*—Stefan V. Chmielewski

(57) ABSTRACT

A video tracking system integrates a pair of video cameras into the vehicle instrument cluster. The video tracking system includes an instrument cluster in a vehicle having at least one vehicle related instrument. A video camera is located in the instrument cluster and is oriented to capture images of a driver of the vehicle. The system includes a processor for processing the images acquired by the video camera and determining one or more characteristics of the driver.

19 Claims, 5 Drawing Sheets

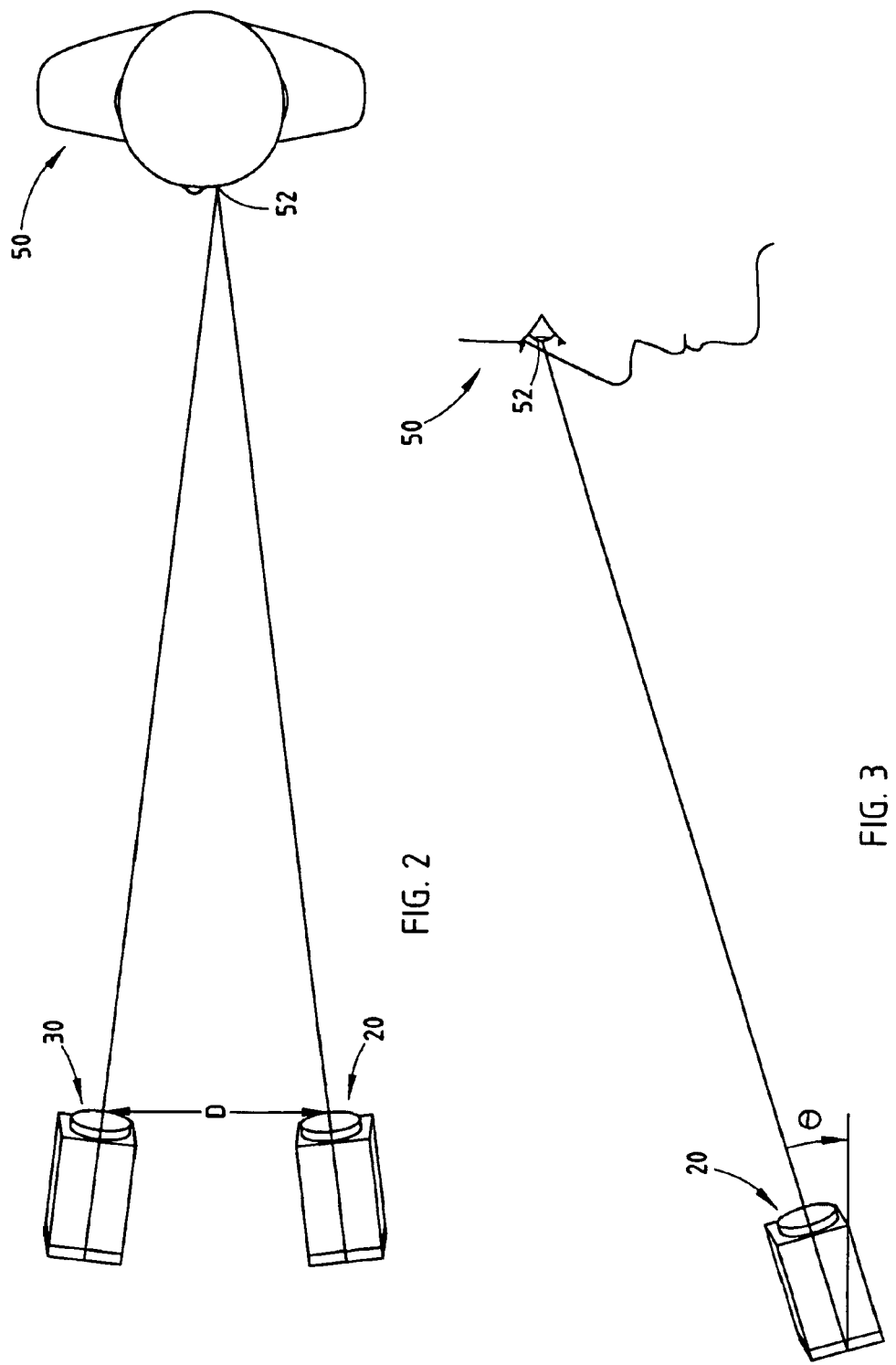

VEHICLE INSTRUMENT CLUSTER HAVING INTEGRATED IMAGING SYSTEM

TECHNICAL FIELD

The present invention generally relates to video processing in a vehicle and, more particularly, relates to video imaging of the driver of a vehicle to detect characteristics of the driver, such as eye tracking.

BACKGROUND OF THE INVENTION

The use of video image tracking of the driver of a vehicle allows for the determination of various facial characteristics of the driver including the position, orientation, and movement of the driver's eyes, face, and head. By knowing driver facial characteristics such as the driver's gaze, ocular data, head position, and other characteristics, vehicle control systems can provide enhanced vehicle functions. For example, a vehicle control system can advise the driver of driver distraction, driver inattention, or drowsy driver situations. In addition, driver facial characteristics can be used to control vehicle functions and adjust sensitivity of certain systems, improve the mode of driver/vehicle communications, and increase the efficiency of driver/control features, among other functions.

In the past, it has been proposed to install an independent tracking system having a video camera added on the vehicle dash or steering wheel column to generate video images of the driver's facial characteristics. However, the proposed dash-mounted video cameras were generally large (bulky) and could obstruct the field of view of the driver. In addition, the images of the driver's face captured with the dash-mounted cameras offer marginal performance. Similarly, proposed steering column mounted cameras likewise may provide inadequate viewing of the driver's face. Further, proposed video tracking systems were intended to be installed as aftermarket systems that required a separately installed video camera and processor which results in added components and substantial cost.

Accordingly, it is desirable to provide for an imaging system for tracking vehicle driver characteristics which does not suffer the drawbacks of the prior proposed approaches. In particular, it is desirable to provide for an image tracking system which can be integrated into the vehicle at low cost and without excessive components. It is further desirable to provide a tracking system which does not interfere with the driver's field of view and operation of the vehicle.

SUMMARY OF THE INVENTION

The present invention provides for an imaging system which integrates one or more video cameras into a vehicle instrument cluster in a vehicle. The imaging system includes an instrument cluster in a vehicle having at least one vehicle-related instrument. A video camera is located in the instrument cluster and is oriented to capture images of the driver of the vehicle. The imaging system further has a processor for processing the images acquired by the video camera and determining one or more characteristics of the driver.

These and other features, advantages and objects of the present invention will be further understood and appreciated by those skilled in the art by reference to the following specification, claims and appended drawings.

BRIEF DESCRIPTION OF THE DRAWING

The present invention will now be described, by way of example, with reference to the accompanying drawings, in which:

FIG. 2 is a top perspective view of the projection of the pair of video cameras toward the face of a vehicle driver;

FIG. 3 is a side perspective view of the projection of one of the video cameras toward the face of the driver;

DESCRIPTION OF THE PREFERRED EMBODIMENT

Figure 1:
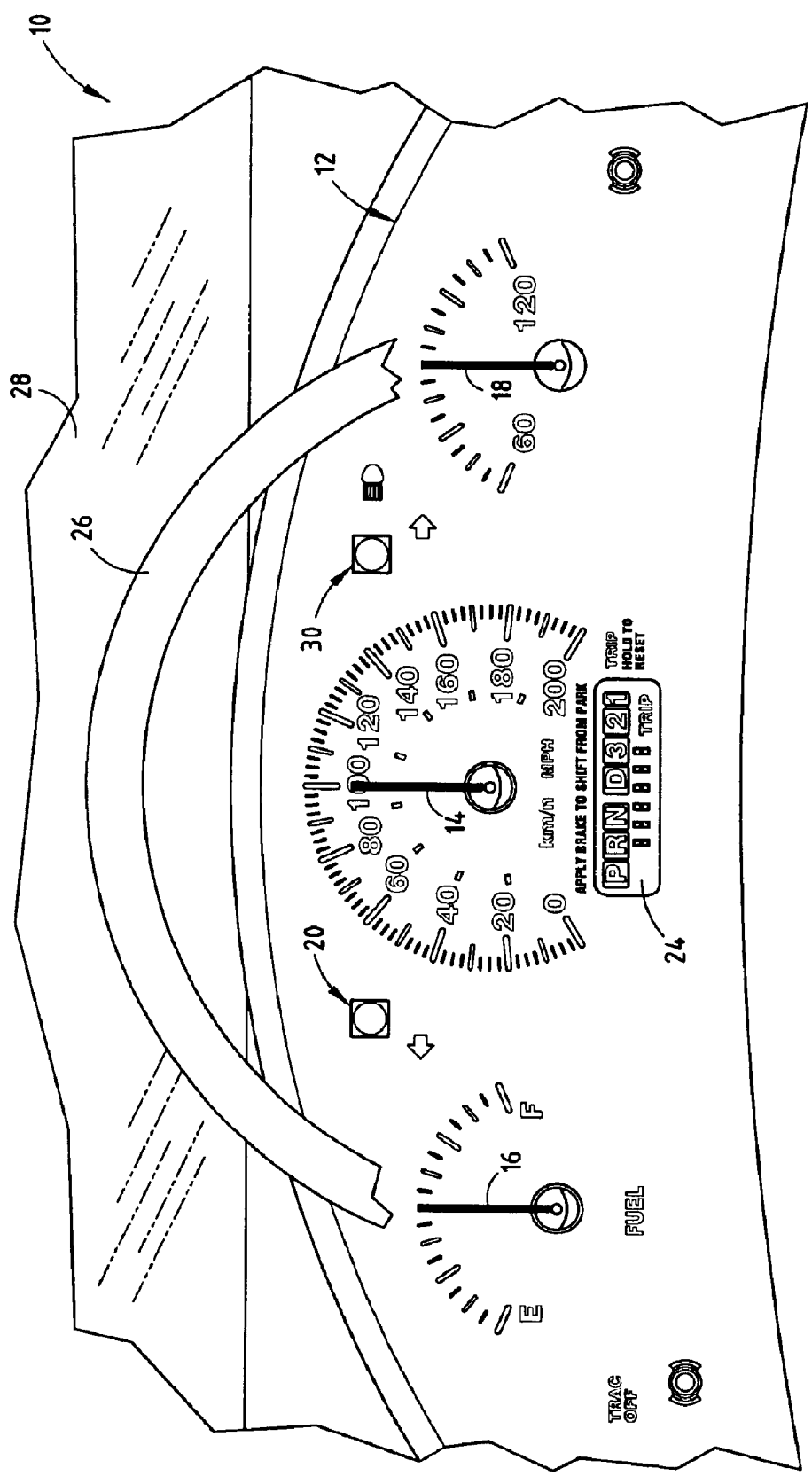
FIG. 1 is a front view of a vehicle instrument cluster having a pair of integrated video cameras according to the present invention.

Referring to FIG. 1, an instrument cluster 12 is generally shown within the passenger compartment of a vehicle 10, generally located in front of the driver of the vehicle 10. The instrument cluster 12 is conventionally located in the vehicle dash at the front of the passenger compartment, forward of the steering wheel 26 and steering column. Accordingly, the instrument cluster 12 is located in front of the vehicle driver and is viewable below the front windshield 28 so that the instrument cluster 12 is readily viewable by the driver. The instrument cluster 12 contains various vehicle-related electronic instruments including a speedometer 14, a fuel gauge 16, an engine coolant temperature gauge 18, and an odometer 24. The instrument cluster 12 may include various combinations of one or more instruments including other instrumentation as is commonly known within the art. Examples of other instruments include an engine oil pressure gauge, a transmission gear selection indicator, and various illuminating indicators. Some of the instruments may display information in a head-up display (HUD) (not shown).

According to the present invention, one or more video cameras are integrated within the instrument cluster 12 for generating images of the driver of the vehicle. The acquired images may then be processed for tracking one or more facial characteristics of the vehicle driver. According to the embodiment shown and described herein, two video cameras are integrated within the instrument cluster 12 and are referred to herein as first camera 20 and second camera 30. While first and second video cameras 20 and 30 are disclosed herein in detail, it should be appreciated that one or more than two video cameras may be integrated within the instrument cluster 12 without departing from the teachings of the present invention.

The first and second cameras 20 and 30 are mounted to the instrument cluster 12, such that each camera captures an image of the region where the driver of the vehicle is expected to be located during normal vehicle driving. More particularly, the images capture the driver's face, including one or both eyes and the surrounding ocular features generally formed in the area referred to as the ocular adnexa. Referring to FIGS. 2 and 3, the video cameras 20 and 30 are shown focused on an eye 52 of the driver's face 50. As seen in FIG. 2, the first and second cameras 20 and 30 are spaced apart from each other by a distance D in the range of about eight to fifteen centimeters (8 to 15 cm). By mounting the first and second cameras 20 and 30 side-by-side separated by a minimum distance D of eight centimeters (8 cm), images of the front and both left and right sides of the driver's face may be obtained. This allows for enhanced imaging of the driver's facial characteristics, particularly during rotation of the driver's head (e.g., 120° of side-to-side rotation). Additionally, the use of two spaced cameras 20 and 30 provides a stereo signal which further allows for the determination of distance to a feature.

With particular reference to FIG. 3, the first camera 20 is shown focused at an inclination angle θ relative to the horizontal plane of the vehicle. The inclination angle θ is within the range of fifteen to thirty degrees (15° to 30°). An inclination range θ in the range of fifteen to thirty degrees (15° to 30°) provides a clear view of the driver's ocular features including one or both eyeballs and the pupil of the eyeballs, the superior and inferior eyelids, and the palpebral fissure space between the eyelids. The second camera 30 is similarly mounted at the same or similar inclination angle θ.

Figure 4:
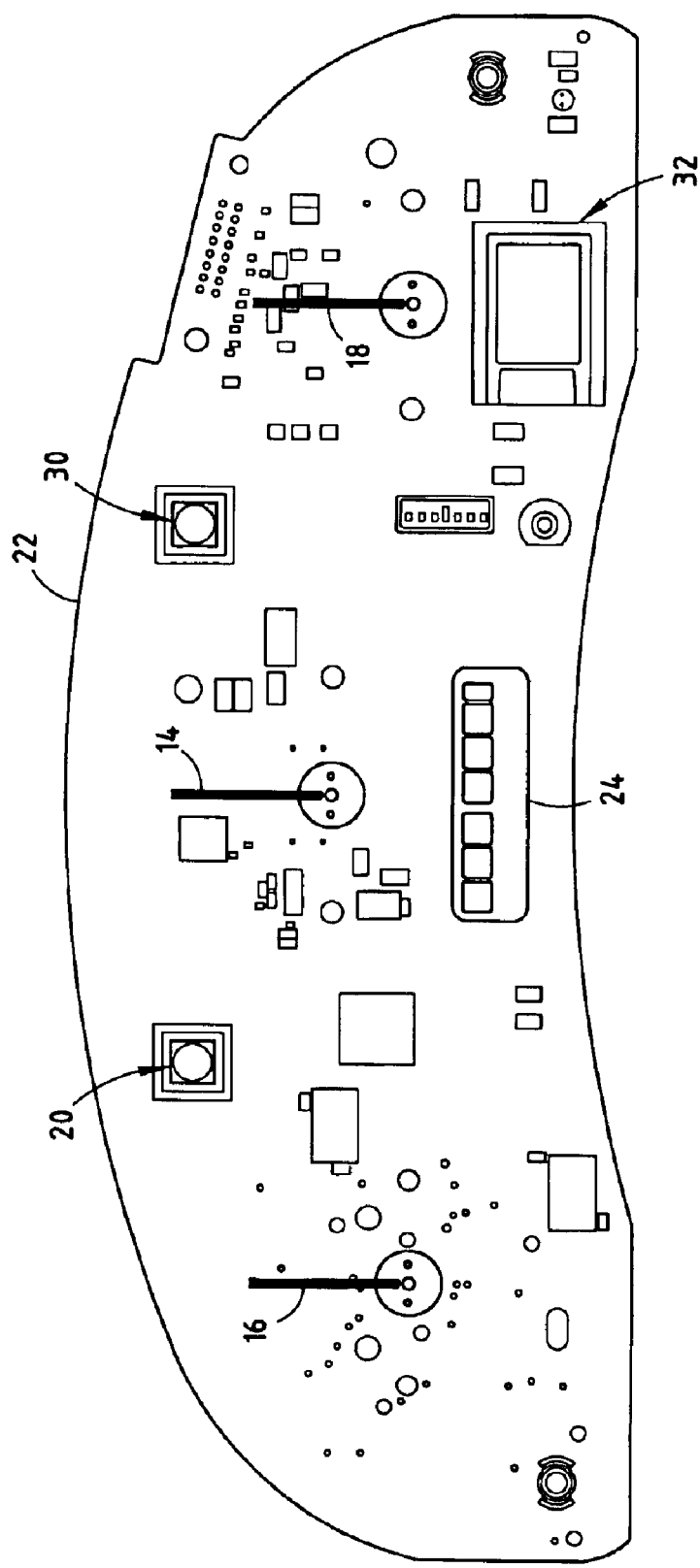
FIG. 4 is a front view of an instrument cluster circuit board containing a pair of CMOS video cameras and tracking processor.

The instrument cluster 12 includes a circuit board 22 containing the various instruments as shown in FIG. 4. The circuit board 22 has many of the instrument cluster instruments wired and mounted to the circuit board 22 including the speedometer 14, fuel gauge 16, engine coolant temperature gauge 18, and odometer 24. According to the present invention, the first and second cameras 20 and 30 and a processor, such as an eye tracking processor 32, are integrally mounted to the circuit board 22. According to one embodiment, the eye tracking processor 32 may include a shared processor that is also dedicated to processing data for one or more instruments in the instrument cluster. According to another embodiment, the eye tracking processor 32 may be a separate processor dedicated to video processing of the captured video images.

Figure 5:
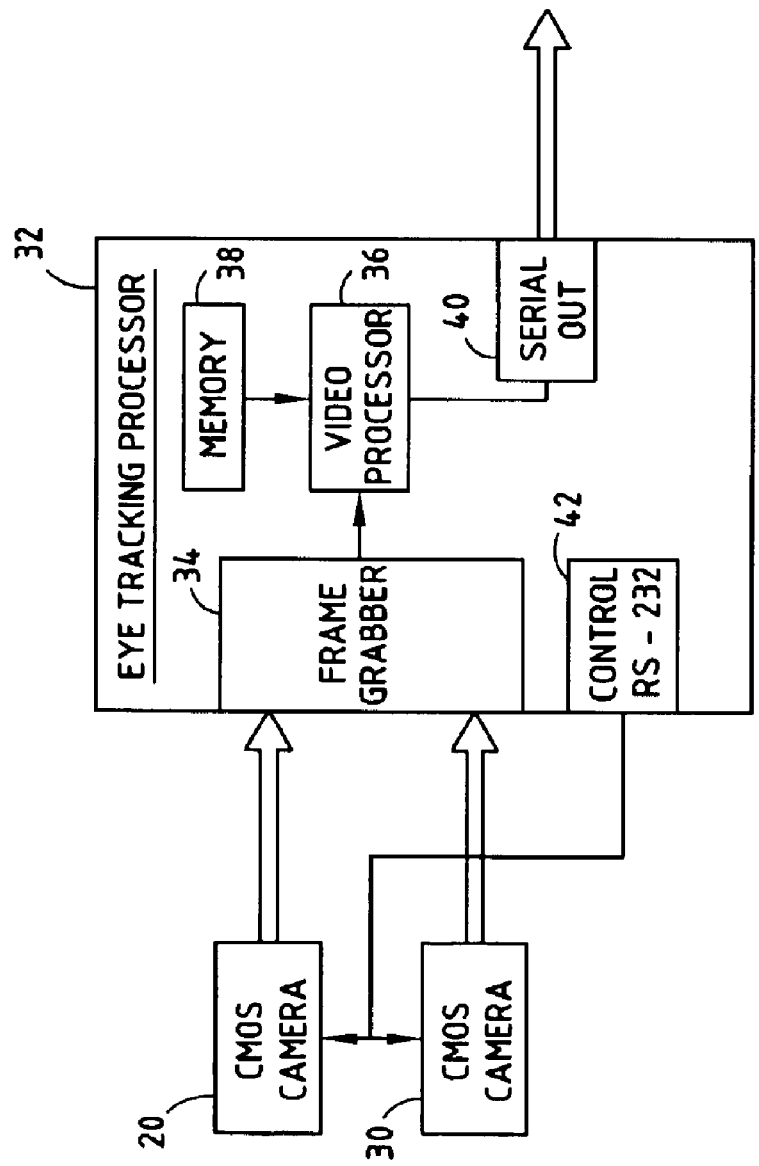
FIG. 5 is a block diagram further illustrating the video cameras and tracking processor.

Referring to FIG. 5, the first and second cameras 20 and 30 are further shown coupled to the eye tracking processor 32. Video cameras 20 and 30 may include CCD/CMOS active-pixel digital image sensors mounted as individual chips onto the circuit board 22. One example of a CMOS active-pixel digital image sensor is Model No. PB-0330, commercially available from Photobit, which has a resolution of 640H×480V. The use of digital image sensors for first and second cameras 20 and 30 also allows for the detection of stereo information.

The eye tracking processor 32 is shown having a frame grabber 34 for receiving the video frames generated by the first and second cameras 20 and 30. Processor 32 also includes a video processor 36 for processing the video frames. The processor 32 includes memory 38, such as random access memory (RAM), read-only memory (ROM), and other memory as should be readily apparent to those skilled in the art. The processor 32 may be configured to perform one or more routines for identifying and tracking one or more features in the acquired video images, and may be further configured to perform one or more vehicle functions based on the tracked information. For example, the image tracking system may identify and track a facial characteristic of the driver, such as ocular motility or palpebral fissure, and determine a drowsy driver situation. According to another example, the video tracking system may determine the presence of a distracted or inattentive driver. In response to determining any of the aforementioned driver conditions, the image tracking system may generate a warning signal via serial output 40 to warn the driver, initiate corrective action, or take other action.

Further, the processor 32 has a control function 42 via RS-232 which allows for control of each of the first and second cameras 20 and 30. Control of first and second cameras 20 and 30 may include automatic adjustment of the pointing orientation of the first and second cameras 20 and 30. For example, the first and second cameras 20 and 30 may be repositioned to focus on an identifiable feature, and may scan a region in search of an identifiable feature. Control may also include adjustment of focus and magnification as may be necessary to track an identifiable feature. Thus, the image tracking system may automatically locate and track an identifiable feature, such as the driver's eye.

Figure 6:
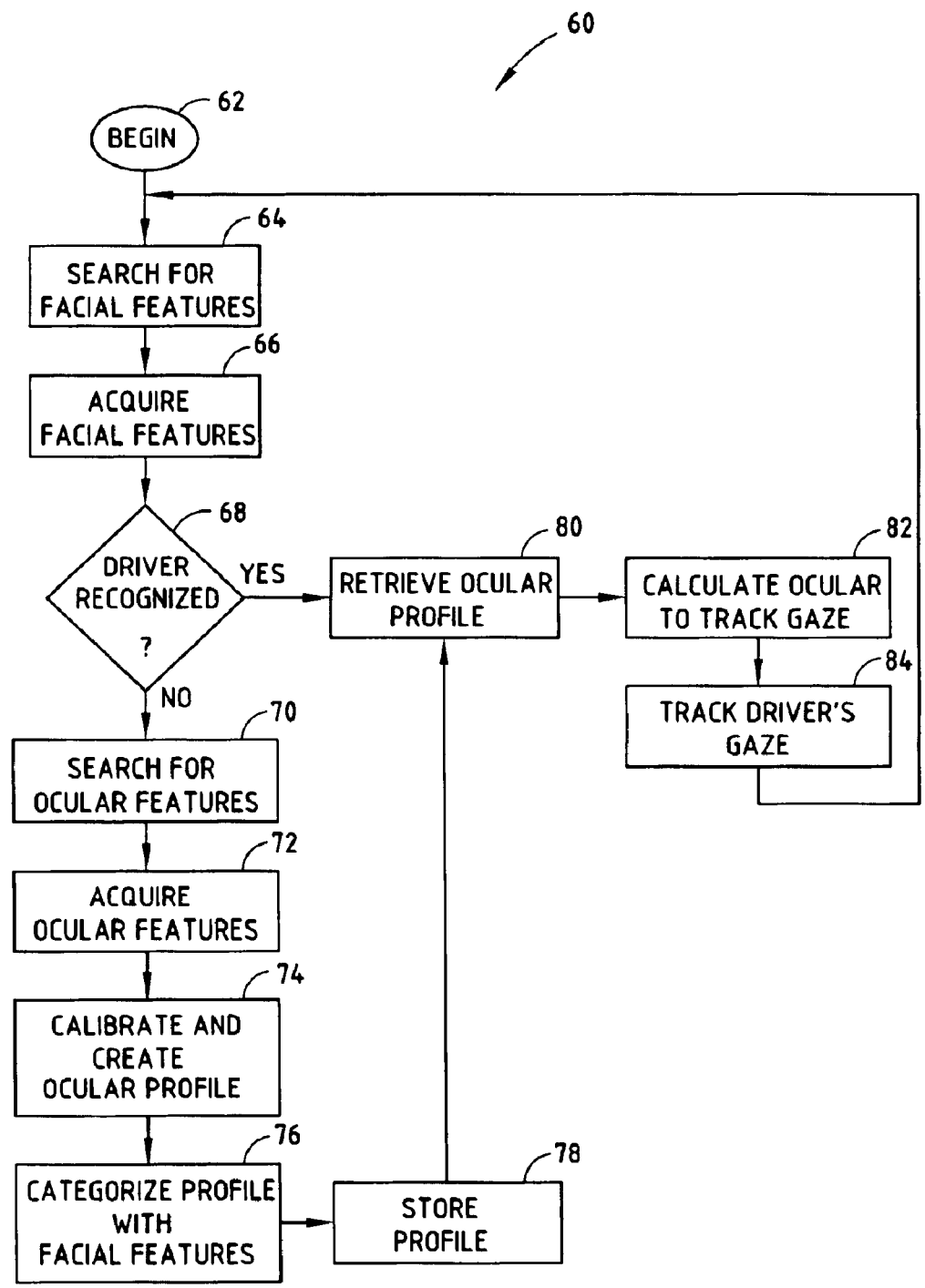
FIG. 6 is a flow diagram illustrating a method of facial recognition and tracking of driver facial characteristics.

Referring to FIG. 6, an eye tracking routine 60 is illustrated according to one embodiment. The eye tracking routine begins at step 62 and proceeds to search for facial features in step 64. In step 66, the routine 60 acquires the facial features and, in decision step 68, determines if the driver has been recognized. If the driver has been recognized, routine 60 proceeds to step 80 to retrieve the ocular profile of the recognized driver. If the driver has not been recognized from the required facial features, routine 60 will search for and create a new ocular profile in steps 70 through 78. This includes searching for ocular features in step 70, acquiring ocular features in step 72, and calibrating and creating an ocular profile in step 74. In step 76, the ocular profile is categorized with facial features. Thereafter, the ocular profile is stored in memory in step 78.

If either the driver has been recognized or a new profile has been stored in memory, eye tracking routine 60 will retrieve the ocular profile in step 80. Thereafter, routine 60 calculates the ocular to track gaze in step 82. Calculation of the ocular may include determining diameter of the iris, pupil, and eyeball centroid, as examples. Finally, the eye tracking routine 60 proceeds to track the driver's gaze in step 84, before returning to step 64.

By tracking the driver's gaze, the eye tracking routine 60 may determine driver drowsiness, driver distraction, driver inattention and other driver related conditions. A determination of one or more of the aforementioned conditions may enable a vehicle control system to take corrective action.

Accordingly, the image tracking system of the present invention advantageously integrates one or more video cameras into the instrument cluster 12 of the vehicle to allow for facial tracking of the driver by integrating the video cameras into the instrument cluster 12. The video tracking system does not interfere with the driver's field of view, and system components can easily be integrated into the instrument cluster 12 to provide a low cost system with minimal additional components.

It will be understood by those who practice the invention and those skilled in the art, that various modifications and improvements may be made to the invention without departing from the spirit of the disclosed concept. The scope of protection afforded is to be determined the claims and by the breadth of interpretation allowed by law.

What is claimed is:

1. An imaging system integrated in an instrument cluster of a vehicle, said system comprising:
    an instrument cluster in a vehicle comprising at least one vehicle related instrument;
    a first video camera located in the instrument cluster and oriented to capture images of a driver of the vehicle;
    a second video camera located in the instrument cluster of the vehicle and oriented to capture images of the driver of the vehicle; and
    a processor for processing the images acquired by the first and second video cameras and determining one or more characteristics of the driver.

2. The system as defined in claim 1, wherein the first and second video cameras are displaced from one another.

3. The system as defined in claim 2, wherein the first and second video cameras are displaced by a distance of at least 8 cm.

4. The system as defined in claim 1, wherein each of the first and second video cameras is projected at an inclination angle in the range of 15° to 30° relative to a horizontal axis of the vehicle.

5. The system as defined in claim 1, wherein the first and second video cameras are mounted on a circuit board within the instrument cluster.

6. The system as defined in claim 1 further comprising a circuit board, wherein the at least one instrument, the first and second video cameras, and processor are mounted to the printed circuit board.

7. The system as defined in claim 1, wherein each of the first and second video cameras comprises an integrated circuit imager.

8. The system as defined in claim 1, wherein said at least one instrument comprises any one of a speedometer, a fuel indicator, and a temperature indicator.

9. An image tracking system integrated in an instrument cluster of a vehicle, said system comprising:
- an instrument cluster for mounting in a vehicle and comprising a circuit board and at least one vehicle related instrument connected to the circuit board;
- a video camera located in the instrument cluster and connected to the circuit board, wherein the video camera is oriented to capture images of a driver of the vehicle; and
- a processor for processing the images acquired by the video camera and tracking one or more characteristics of the driver.

10. The system as defined in claim 9, wherein the video camera comprises a first video camera and a second video camera, wherein the first and second video cameras are displaced from one another.

11. The system as defined in claim 10, wherein the first and second video cameras are displaced by a distance of at least 8 cm.

12. The system as defined in claim 9, wherein the video camera is projected at an inclination angle in the range of 15° to 30° relative to a horizontal axis of the vehicle.

13. The system as defined in claim 9, wherein the processor is connected to the circuit board.

14. The system as defined in claim 9, wherein the video camera comprises an integrated circuit imager.

15. An image tracking system integrated in an instrument cluster of a vehicle, said system comprising:
- an instrument cluster for mounting in a vehicle and comprising at least one vehicle related instrument;
- a first video camera located in the instrument panel and oriented to capture images of the driver of the vehicle;
- a second video camera located in the instrument cluster and oriented to capture images of the driver of the vehicle, wherein the first and second video cameras are displaced from one another; and
- a processor for processing the images acquired by the first and second video cameras and determining one or more characteristics of the driver.

16. The system as defined in claim 15, wherein the first and second video cameras are displaced by a distance of at least 8 cm.

17. The system as defined in claim 15, wherein the instrument cluster further comprises a circuit board, wherein the at least one instrument, the first and second video cameras, and processor are mounted to the printed circuit board.

18. The system as defined in claim 15, wherein the first and second video cameras each comprises an integrated circuit imager.

19. The system as defined in claim 15, wherein said at least one instrument comprises any one of a speedometer, a fuel indicator, and a temperature indicator.

* * * * *